Patented Sept. 22, 1953

2,653,099

UNITED STATES PATENT OFFICE 2,653,099

QUICK-COOKING CEREAL AND METHOD OF MAKING SAME

Charles R. Carman, Park Forest, and Jim E. Allison, Elmhurst, Ill., assignors to Guardite Corporation, a corporation of Delaware No Drawing. Application July 2, 1953, Serial No. 366,046. In Canada March 5, 1951

6 Claims. (Cl. 99—82)

This invention relates to a pre-cooked cereal and a method of preparing the same and particularly to a pre-cooked oat product.

This application is a continuation-in-part of our co-pending application Serial No. 259,313, filed November 30, 1951, now abandoned, which in turn was a continuation-in-part of our application Serial No. 161,744, filed May 12, 1950, now abandoned.

The pre-cooking of cereal is not a new art, but the problem of pre-cooking cereals, drying them, and then having them reconstitute rapidly in water, without loss of flavor, palatability, or granular identity has heretofore not been satisfactorily solved.

The formation of the present product involves the following factors:

1. In order to procure a uniform product, the moisture content of the material should be uniform as between kernels and uniform throughout each kernel. Depending upon the type of cereal employed, the moisture range will vary and the uniformity may be obtained as desired. In some instances, it is preferred to temper the kernel, particularly rice.

2. The product should be cooked by steam or otherwise under conditions which establish a proper moisture content and cause the starch to become uniformly gelatinized so as to bring the product to a sufficient state of plasticity properly to expand. The conditions should be adjusted so that each kernel should be cooked to substantially the same degree and in addition these conditions are preferably of such a nature that the non-condensable gases in the kernels are removed therefrom. This latter condition may be established under vacuum conditions under which the contained moisture boils and washes out the non-condensable gases in the kernels. During the cooking a bleed or purge line is maintained so that any non-condensable gases generated during the cooking or supplied with the cooking may be eliminated.

3. When the product is properly cooked and is at the proper moisture content, it is suddenly shot into a vacuum zone, causing expansion of the product. The conditions of the resulting explosion should be such as to cause cold setting of the product. The temperature is determined by the vacuum conditions into which the product is fired and the ability to maintain these conditions during the resulting explosion and concomitant expansion of the product. This means that with commercially practicable vacuum equipment, the expansion chamber of necessity has a volume enormously greater than the cooking chamber. In actual practice, this has been of the order of 330 to 1 in volume using vacuum equipment having the capacity of pulling a vacuum of 0.2 inch of mercury absolute from atmospheric conditions in a period of about 15 minutes. The preferred vacuum at the start of the expansion of the product is of the order of 0.1 to 0.2 inch of mercury absolute. In such apparatus the pressure may ride up somewhat during the explosion step. It is preferred to continue evacuation of the expansion chamber during the explosion and to maintain it at as low a pressure as is practicable. The temperature to which the product is cooled is normally determined by the vacuum condition during the explosion step. For example, tests have shown that when 20 lbs. of rice are exploded from a one cubic foot cooking chamber into a 330 cubic foot expansion chamber using the vacuum equipment described above, the pressure in the expansion chamber being maintained at approximately 0.1 inch of mercury absolute, the product attains a temperature of approximately 27° F. It is believed that the results follow because of a blast or velocity effect caused by the uniform and sudden passage of the steam outwardly, the degree and speed of which is determined by the first blast of the explosion providing that explosion is free to continue until all of the product has been subjected to it. Because of this fact, the pressure condition in the product apparently stimulates that of the initial vacuum in the chamber, just as an exhaust pipe of a motor will draw in air through a vent even when the pressure within the exhaust pipe is above atmospheric provided gases are moving through the pipe toward the exit.

4. The starch is substantially completely gelatinized.

5. The time-temperature relationships are sufficiently short and low respectively, that browning or scorching is avoided.

6. The product must not be so much cooked as to change the cell walls so as to render them impervious to steam, since otherwise they would rupture on expansion.

7. The moisture content, and cooking time, temperature and pressure, and the vacuum into which the product is fired are selected to produce a product which is vacuum expanded, but avoids undue enlargement of the particles such as occurs in the manufacture of ordinary puffed cereals, and has a hydration rate of at least ⅓ greater than that of the original cereal grains after immersion in water at a temperature of about 200° F. for a period of about 20 minutes.

Removal of the non-condensible gases from the cereal, cooking, and vacuum expansion are preferably carried out in a puffer of the type disclosed in the Doyle Patent No. 2,627,221, issued February 3, 1953. In such an apparatus a steaming chamber is provided within which the product may be placed. This steaming chamber is connected by a triggered door to an expansion chamber. The expansion chamber is preferably kept at a low pressure, means being provided to maintain a low pressure during the expansion. The steaming chamber is provided with an evacuating means, steaming means, and usually with a purge or bleed line through which non-condensible gases can be eliminated as well as some condensed steam which develops during steaming.

The steps of removing the non-condensible gases from the product in cooking may be carried out before introduction into the puffer, but convenience is best served by carrying out the operation in one device.

In the case of oats, particularly steel-cut oats, the bran continues to adhere to the starch portions of the grain, even though the latter have substantially enlarged. Whether the bran itself is stretched or enlarged is not clear. The original small wrinkles which are characteristic of the bran in oats are not usually present in the treated material and the surface of the bran has a somewhat more vitreous appearance and appears to have actually stretched as well as smoothed out the wrinkles. In some instances, the bran has cracked due to the expansion strains.

On fracture, or if already cut before treatment, the vacuum expanded quick-cooking oat product appears to consist of a large number of bubbles of about the same shape and considerably larger than the cells originally present. Possibly, some of these cellular formations have been produced by coalition of cells in the original starch material, but the appearance is still cellular. The color of the vacuum expanded oat material is white like a snowball.

In some instances, the exposed starch surfaces of an oat cut before vacuum expansion have a somewhat more vitreous appearance than the immediately underlying portions, but this is not always the case. All of the starch material which has been vacuum expanded has a gelatinized, vitreous appearance, somewhat like ice; but the surface characteristic just referred to is one in which the product has the appearance of some interfusion between the cells of the surface to provide a greater continuity to the vitreous appearance.

Upon rolling, flaking or crushing, the appearance of the material, although whiter than the original unexpanded material, loses some of its vitreous appearance to the naked eye, but continues to retain much of it when viewed under the glass as, for example, at 15 to 40 powers.

The oat product may be prepared in steel-cut form or the steel-cut material may be rolled or flaked. In either event, the material is capable of quick-cooking and rapid re-hydration. Although flavor and texture are affected by rolling or flaking, it is the quick-cooking and the rate of re-hydration which are particularly improved by rolling.

The oat product of this process has a volume from 1⅔ to 3½ times the original oat grains. Put conversely, the specific gravity as determined from cup weights is from 28.5% to 60% of the specific gravity of the original grains.

The following Table I gives a list of treatments accorded to regular, Clinton brand, steel-cut groats, each groat being severed in two or three pieces in the cutting process. The first column gives the example number; the second column gives the loading in the cooking or steam chamber, the size of this chamber being approximately 13 inches in diameter, 16⅔ inches in depth and having a volume of 2,175 cubic inches. Column 3 gives the amount of pre-tempering applied to the grain. The next column gives the tempering time. Thus, in the first example, 2 pounds of water was applied for two hours to 10 pounds of oat groats before the application of the cooking-expanding cycle.

Column 5 gives the treatment provided before the expansion. Thus, in Example 1, the oats were placed in the steam chamber, the pressure raised to 35 pounds per square inch gauge and held there for 5 minutes. In all cases, before application of the steam, the oats had been subjected to a vacuum of the order of 0.2 inch of mercury absolute, the oats being at a temperature not less than about 40° F. so as to remove air and other non-condensible gases from the oats, and then the steam was admitted at a predetermined rate to reach the gauge pressure. In all cases, unless specified otherwise, a bleed line was kept open during the introduction of the steam into the steam chamber so as to remove condensate and any non-condensible gases which might be formed in or introduced into the chamber.

In all cases, after the completion of steaming, the triggered door of the puffing apparatus was opened instantaneously and the oats fired into the expansion chamber, which was at a pressure of about 0.2 inch of mercury absolute. The pressure within the expansion chamber was maintained at a low point by continuing the evacuation during the expansion, and normally the pressure in that chamber was not permitted to exceed 1½ to 2 inches of mercury absolute. In some instances, however, we have operated successfully with the pressure in the expansion chamber following explosion riding up as high as 3½ to 7 inches of mercury absolute as measured on a standard mercury manometer, but in most instances, the pressure was reduced below 1 inch of mercury absolute within a few minutes, and before re-imposition of atmospheric pressure.

The oats, prior to tempering, contained about 8 to 10% moisture. Above about 3½ pounds of water for 10 pounds of oats in the tempering operation tends to produce clustering of the grains on puffing. Tempering is not required with oats and the flavor of the oats if not tempered is preferred by many to the flavor produced upon tempering.

*Table I*

| (1) Example | (2) Load Size | (3) Temper | (4) Temper Time | (5) Treatment Before Expansion |
|---|---|---|---|---|
| 1 | 10# | 2# water | 2 hours | Gage steam pressure 35# for 5 min. |
| 2 | 10# | do | 3 hours | Steam pressure 35# for 10 min. |
| 3 | 10# | do | 5 hours | Steam pressure 35# for 15 min. |
| 4 | 10# | do | 4 hours | Steam pressure 35# for 20 min. |
| 5 | 10# | do | 2 hours | Steam pressure 45# for 10 min. |

Table I (continued)

| (1) Example | (2) Load Size | (3) Temper | (4) Temper Time | (5) Treatment Before Expansion |
|---|---|---|---|---|
| 6 | 10# | ___do___ | 3 hours | Steam pressure 55# for 10 min. |
| 7 | 10# | 3# water | 2 hours | Steam pressure 45# for 10 min. |
| 8 | 10# | 4# water | 3 hours | Do. |
| 9 | 10# | 5# water | 5 hours | Do. |
| 10 | 10# | 2# water | 5 hours | Steam pressure 55# for 5 min. |
| 11 | 10# | 3# water | 6 hours | Do. |
| 12 | 10# | 2# water | 2 hours | Steam pressure 55# for 30 sec. |
| 13 | 10# | ___do___ | 2½ hours | Steam pressure 55# for 2 min. |
| 14 | 10# | ___do___ | 5 hours | Steam pressure 55# for 3½ min. |
| 15 | 10# | ___do___ | 2½ hours | Steam pressure 65# for 1 min. |
| 16 | 10# | ___do___ | 2 hours | Steam pressure 55# for 3½ min. |
| 17 | 10# | none | none | Steam pressure to 100# in 25 sec.—hold 15 sec. |
| 18 | 10# | ___do___ | ___do___ | Steam pressure to 100# in 20 sec.—hold 5 sec. |
| 19 | 10# | 3½# water | 5 hours | Steam pressure to 100# in 25 sec. |
| 20 | 10# | none | none | Steam pressure to 100# for 10 min. |
| 21 | 10# | ___do___ | ___do___ | Steam pressure to 100# in 15 sec.—hold 45 sec. |
| 22 | 10# | 3½# water | 4 hours | Steam pressure to 100# in 30 sec.—hold 30 sec. |
| 23 | 38# | none | none | Steam pressure to 100# in 70 sec. |
| 24 | 45# | ___do___ | ___do___ | Steam pressure to 100# in 100 sec. |
| 25 | 45# | ___do___ | ___do___ | Steam pressure to 100# in 85 sec. |
| 26 | 45# | ___do___ | ___do___ | Steam pressure to 100# in 80 sec. |
| 27 | 45# | ___do___ | ___do___ | Steam pressure to 100# in 95 sec. |
| 28 | 40# | ___do___ | ___do___ | Steam pressure to 100# in 65 sec. |
| 29 | 40# | ___do___ | ___do___ | Steam pressure to 75# in 55 sec.—hold 5 sec. |
| 30 | 40# | ___do___ | ___do___ | Steam pressure to 65# in 65 sec.—hold 10 sec. |
| 31 | 40# | ___do___ | ___do___ | Steam pressure to 55# in 50 sec. |
| 32 | 40# | ___do___ | ___do___ | Steam pressure to 45# in 45 sec.—hold 30 sec. |
| 33 | 40# | ___do___ | ___do___ | Steam pressure to 25# in 30 sec. |
| 34 | 40# | ___do___ | ___do___ | Steam pressure to 100# in 59 sec. |
| 35 | 40# | ___do___ | ___do___ | Steam pressure to 65# in 40 sec. |
| 36 | 10# | ___do___ | ___do___ | Steam pressure to 100# in 26 sec. |
| 37 | 10# | ___do___ | ___do___ | Steam pressure to 65# in 17 sec. |
| 38 | 10# | ___do___ | ___do___ | Steam pressure to 65# in 20 sec. |
| 39 | 40# | ___do___ | ___do___ | Steam pressure to 100# in 64 sec. |
| 40 | 10# | ___do___ | ___do___ | Steam pressure 5# for 45 min.—raise to 100# |
| 41 | 10# | ___do___ | ___do___ | Steam pressure 5# for 25 min.—raise to 100# |
| 42 | 10# | ___do___ | ___do___ | Steam pressure 5# for 5 min.—raise to 100# |
| 43 | 10# | 2# water | 1¼ hours | Steam pressure 5# for 45 min.—raise to 100# |
| 44 | 10# | ___do___ | 3 hours | Steam pressure 5# for 25 min.—raise to 100# |
| 45 | 10# | ___do___ | 2 hours | Steam pressure 5# for 5 min.—raise to 100# |
| 46 | 10# | none | none | Alternately, steam at 15# for 2 min. eight times, and evacuate for 25 sec. seven times—8th evacuation is 5 min. then steam to 100# in 24 sec. |
| 47 | 10# | 2# water | 2 hours | Alternately, steam at 15# for 2 min. eight times, and evacuate for 25 sec. seven times—8th evacuation is 5 min. then steam to 100# in 24 sec. |
| 48 | 10# | none | none | Steam pressure to 5# for 45 min.—raise to 100# |
| 49 | 10# | ___do___ | ___do___ | Alternately, steam at 15# for 2 min. eight times, and evacuate for 25 sec. seven times—8th evacuation is 5 min. then steam to 100# in 24 sec. |
| 50 | 10# | ___do___ | ___do___ | Steam pressure to 100# in 30 sec. |
| 51 | 10# | ___do___ | ___do___ | Steam pressure 5# for 45 min.—raise to 100#. |
| 52 | 10# | washed | ___do___ | Oats gained 2.88# water during wash. Steam pressure 5# for 45 min.—raise to 100#. |
| 53 | 10# | none | ___do___ | Steam pressure 5# for 85 min.—raise to 100#. |
| 54 | 10# | ___do___ | ___do___ | Steam pressure 10# abs. for 85 min.—raise to 100#. |
| 55 | 45# | ___do___ | ___do___ | Steam pressure to 100# in 65 sec. |
| 56 | 45# | washed | ___do___ | Oats gained 4½# water during wash—steam pressure to 100# in 55 sec. |
| 57 | 20# | none | ___do___ | Steam pressure to 75# in 33 sec. |
| 58 | 10# | 2# water | 2 hours | Steam pressure to 75# in 23 sec. |
| 59 | 10# | ___do___ | 3 hours | Antioxidant added to temper water. Steam pressure to 75# in 28 sec. |
| 60 | 10# | washed | 18¼ hours | Steam pressure to 75# in 24 sec. |
| 61 | 10# | ___do___ | 19¼ hours | Glycerine added. Steam pressure to 75# in 26 sec. |
| 62 | 10# | ___do___ | 19¾ hours | Glycerine+NaHCO₃ added. Steam pressure to 75# in 23 sec. |
| 63 | 30# | none | none | Steam pressure to 100# in 47 sec. |
| 64 | 10# | ___do___ | ___do___ | Steam pressure to 40# in 18 sec. |
| 65 | 10# | ___do___ | ___do___ | Steam pressure to 75# in 21 sec. |
| 66 | 10# | ___do___ | ___do___ | Steam pressure to 100# in 26 sec. |
| 67 | 10# | ___do___ | ___do___ | Steam pressure to 100# for 4 min. |
| 68 | 10# | ___do___ | ___do___ | Steam pressure to 100# for 2 min. |
| 69 | 10# | ___do___ | ___do___ | Steam pressure 55# for 15 min.—raise to 100#—hold 1 min. |

All of the examples listed above were a satisfactory quick-cooking oat product having the above described properties. The optimum cycles were those in the range of 55–75 pounds steam pressure.

The oat product may be cooked by using 1¼ cups of water with ¼ teaspoon of salt, the water boiled, and then 1 cup of the oats in rolled form stirred in, boiled for one minute while uncovered, removed from the fire, covered, and allowed to stand for two minutes. The product may be prepared by pouring hot water onto the rolled oats, or by bringing rolled oats plus cold water to a boil; but these latter two methods give a greater raw oats flavor than the method first described.

In the case of preparing a precooked rice product the following additional factors are involved:

a. In order to procure a uniform product, the moisture content of the material should be uniform as between kernels and uniform throughout each kernel. The preferred range is 18% to 26% with approximately 20% to 22% providing the maximum benefits. The uniformity may be obtained as desired, but the tempering method hereinafter described is preferred.

b. The moisture content, and cooking time, temperature and pressure and the vacuum into which the product is fired are selected to produce a product having a volume from 1⅔ to 3½ times the volume of the original kernels as determined by their cup weights. Put conversely, the specific gravity as determined from cup weights is from 28.5% to 60% of the specific gravity of the original kernels. The preferred cup weights for rice having a 180-gram original weight per cup is from 55 to 85 grams per cup and the best products from a commercial point of view appear to be those between 65 and 75 grams per cup, although on this point tastes may differ. Products above 75 grams cup weight are denser and harder, but less subject to breakage.

c. The time-temperature relationships are sufficiently short and low respectively that the rice product from a nutritional standpoint has a positive protein efficiency whereas previous cooked rice products have a negative protein efficiency. Likewise, the thiamine content of the rice product is relatively very high compared to prior similar products.

The rice product of this process has a volume from 1⅔ to 3½ times the original kernels. The shape of the original kernels is roughly maintained, although the outer surface of the expanded material is rough. The product is not case hardened so far as can be observed, but is uniform throughout. On cross section, the kernels have a large number of relatively small cavities substantially uniformly distributed throughout the interior. These cavities while by no means spherical, are generally rounded at their protuberances, indicating that they were formed by pressure outwards rather than by shrinkage and collapse inwards. The product is capable of ready hydration to form a product resembling ordinary cooked rice without loss of the identity of the kernels and when so hydrated resembles ordinary cooked rice, although its flavor is different from that of ordinary cooked rice or of prior quick-cooking rice products.

The product is not transparent but is translucent, having a milky-white appearance. Under the glass the individual cell walls appear transparent, although not completely clear. Tranverse fracture rings frequently occur at spaced intervals along the kernel, from 7 to 10 of these rings being customary but apparently not necessarily formed during the puffing. In fact in many cases, these may be seen in the washed material before cooking.

The present product has been made from rice from various sources. Texas, Louisiana, Arkansas and California varieties have been employed. Some of the rice has been long grain, other, short grain. Arkansas Riceland brand and Texas Patna type are examples of the long grain variety. The Patna, however, has a smaller average diameter and is much harder. Texas and Louisiana rices are normally flinty, while Arkansas rices are softer. California rice is normally short and fat grained material. Normally, the Texas Patna rice is milled to 99% purity and conformity, while the other rices are milled to 95% and 96%. The Patna and Riceland products are normally whiter than the others. Quick-cooking products may be made from all these types, but the cooking and puffing procedures may have to be varied in the individual cases depending upon the type of rice and its condition.

To obtain a quick-cooking rice product having uniformly puffed grains and which is a better marketable product, it is preferred to process rice having a moisture content of about 18% to 26% uniformly distributed throughout the individual cells of the rice kernels.

To so condition the rice, it may be placed in water and allowed to stand with occasional agitation. It may also be placed on a screen, spray washed, and then water added to the rice which is allowed to stand for a time with occasional agitation. A third method which appears to be the most satisfactory, is to place the rice on a screen and spray wash with warm water for a period of 1¼ to 3½ minutes depending upon the condition of the rice; then, after draining the excess water from the outer surface of the rice kernels, temper by placing the kernels in a closed container and allow them to stand for a period of time with occasional agitation until a moisture content of from 18% to 26% is uniformly distributed throughout the individual cells of the rice kernels. Generally speaking, this will take from 1 to 1½ hours and the temperature of the rice will rise from about 70° F. to 100° F. as a result of the warm water wash. The rice may be left in the container for 24 hours or longer at room temperature and upon removal from the container has a dry outer surface.

It is preferred to use water at a temperature of from 95° F. to 110° F. when spray washing and the length of time of this washing will vary according to the temperature of the water being employed and the condition of the rice.

The tempered rice at a temperature of not less than 91° F. is placed in the steam chamber; the pressure in this chamber is reduced to about 1½ inches of mercury absolute or less and held long enough to remove substantially all of the air and other non-condensible gases from the rice kernels, i. e., about two minutes; and then steam is introduced. The atmosphere of steam is maintained until the rice is substantially completely cooked without loss of cellular identity. After cooking has been completed, the rice is fired from a steam pressure substantially above atmospheric in the steam chamber into the expansion chamber which is maintained at about 2 inches of mercury absolute and preferably 0.1 to 0.2 inch so as to expand and cold set the rice kernels. During the expansion step, the momentary pressure may ride up as high as 3½ to 7 inches of mercury absolute as measured on a mercury manometer. This firing is done by suddenly releasing the triggered door of the expansion chamber and the resulting explosion ejects the rice into the expansion chamber. The rice product is then dried in any number of ways, as by exposing the rice to air or by circulating warm dry air about the expanded rice product.

The cooking-expanding cycles may be varied. The rice may be subjected to a particular steam pressure for a given period of time and then the steam pressure increased to from 35 pounds to 65 pounds gauge and held for a period of time (usually shorter) following which the rice is fired into the exacuated expansion chamber. Better control of the variables and best results in the rice product are abtained by slowly increasing the steam pressure from about 1½ inches of mercury absolute to a final pressure of about 35 pounds to 65 pounds gauge at a uniform rate, sometimes followed by a holding period at the final steam pressure so that the rice is completely cooked without loss of cellular identity. The cooked rice is then fired into the expansion chamber which preferably has a pressure of from 0.2 to 0.1 inch of mercury absolute.

The actual values of the variables in the cooking-expanding cycles of this method depend upon the condition and type of rice being used, as well as the degree of expansion desired.

It is preferred not to shoot into the expansion chamber from about 65 pounds gauge or from below 35 pounds gauge. At pressures above 65 pounds gauge the rice product clusters and tends to stick to the chamber walls. Below 35 pounds gauge, the rice product lacks uniformity in size and has a slight hardness of texture.

The pressure within the expansion chamber is maintained at a low point by continuing the evacuation during and after the expansion of the rice. Normally, the pressure in this chamber was not permitted to exceed 1½ to 2 inches of mercury absolute. In some instances, we have operated successfully with the pressure in the expansion chamber following explosion riding up as high as 3½ to 7 inches of mercury absolute as measured on a standard mercury manometer, but in most instances the pressure was reduced below 1 inch of mercury absolute within a few minutes and before reimposition of atmospheric pressure.

The following examples show cooking times which prove satisfactory:

(1) Texas Patna rice was placed in the steam chamber, the pressure was raised by introducing steam to 10 lbs. gauge during a 10 minute period. The pressure was then raised quickly to 35 lbs. gauge and then fired.

(2) California Pearl rice was steamed quickly to 20 lbs., held there for 20 minutes, steamed quickly to 40 lbs., held there for one minute and fired.

(3) California Pearl rice was steamed quickly to 20 lbs., held there for 7 minutes, steamed quickly to 50 lbs., held there for 15 seconds and fired.

(4) California Pearl rice was steamed quickly to 20 lbs., held there for 7 minutes, steamed quickly to 40 lbs., held there for 30 seconds and fired.

(5) California Pearl rice was steamed quickly to 20 lbs., held there for 20 minutes, and then fired.

(6) California Pearl rice was steamed quickly to 20 lbs., held there for 10 minutes, steamed quickly to 40 lbs., held there for 15 seconds and then fired.

(7) California Pearl rice was placed in the steam chamber, pressure raised by steaming to 25 lbs. during 5 minutes, held there for 1 minute, and then fired.

(8) Arkansas Mandalay rice was placed in the steam chamber, pressure raised by steaming to 30 lbs. in one minute, held there for 10 seconds and then fired.

(9) Arkansas Mandalay rice was placed in the steam chamber, pressure raised by steaming to 30 lbs. in 5 minutes, and then fired.

(10) California Pearl rice was steamed quickly to 30 lbs., held there for 7 minutes, steamed quickly to 40 lbs., held there for 30 seconds and then fired.

(11) California Pearl rice was steamed quickly to 30 lbs., held there for 10 minutes and then fired.

(12) Rice was placed in the steam chamber, pressure raised by steaming to 35 lbs. in 5 minutes, held there for 2 minutes and then fired. This cycle was followed using both Arkansas Riceland and Arkansas Fortuna rice.

(13) Rice was placed in the steam chamber, pressure raised by steaming to 35 lbs. during 5 minutes and then fired. Arkansas Fortuna, Arkansas Riceland, Arkansas Mandalay, Texas Patna and California Pearl rice were each used in this cycle.

(14) Texas Patna rice was placed in the steam chamber, pressure raised by steaming to 35 lbs. during 2½ minutes and then fired.

(15) Arkansas Mandalay rice was placed in the steam chamber, pressure raised by steaming to 35 lbs. during 1 minute, held there for ten seconds and then fired.

(16) Arkansas Mandalay rice was placed in the steam chamber, pressure raised by steaming to 35 lbs. during 5 minutes, held there for 3 minutes and then fired.

(17) California Pearl rice was placed in the steam chamber, pressure raised by steaming to 35 lbs. during 5 minutes, held there for 30 seconds and then fired.

(18) Rice was placed in the steam chamber, pressure raised to 35 lbs. during 5 minutes, held there for 1 minute and fired. This cycle was used on Arkansas Mandalay rice and California Pearl rice.

(19) Rice was placed in the steam chamber, pressure raised to 35 lbs. during 5 minutes, held there for 1½ minutes and then fired. This cycle was used on Arkansas Mandalay rice and California Pearl rice.

(20) Arkansas Riceland rice was placed in the steam chamber, pressure raised to 40 lbs. during 5 minutes, held there for 2 minutes and then fired.

(21) Rice was placed in the steam chamber, pressure raised to 40 lbs during 5 minutes, and then fired. This cycle was used on Arkansas Riceland, Arkansas Mandalay, Texas Patna and California Pearl rice.

(22) Arkansas Mandalay rice was placed in the steam chamber, pressure raised by steaming to 40 lbs. during 1 minute, held there for 10 seconds and then fired.

(23) California Pearl rice was placed in the steam chamber, pressure raised by steaming to 40 lbs. during 5 minutes, held there for 30 seconds and then fired.

(24) California Pearl rice was placed in the steam chamber, pressure raised by steaming to 40 lbs. during 5 minutes, held there for 1 minute and then fired.

(25) California Pearl rice was placed in the steam chamber, pressure raised by steaming to 40 lbs. during 5 minutes, held there for 1½ minutes and then fired.

(26) California Pearl rice was steamed quickly to 40 lbs., held there for 5 minutes and 15 seconds and then fired.

(27) California Pearl rice was steamed quickly to 40 lbs., held there for 10 minutes and 15 seconds and then fired.

(28) California Pearl rice was steamed quickly to 40 lbs., held there for 6 minutes and then fired.

(29) Rice was steamed quickly to 40 lbs., held there for 7 minutes and then fired. Arkansas Riceland and California Pearl rice were used.

(30) California Pearl rice was steamed quickly to 40 lbs., held there for 9 minutes and then fired.

(31) California Pearl rice was steamed quickly to 40 lbs., held there for 8 minutes and then fired.

(32) Texas Patna rice was placed in the steam chamber, pressure raised by steaming to 45 lbs. during 5 minutes, held there for 2 minutes and then fired.

(33) Rice was placed in the steam chamber, pressure raised by steaming to 45 lbs. during 5 minutes, and then fired. Arkansas Riceland, Arkansas Fortuna, Arkansas Mandalay and Texas Patna rices were used.

(34) California Pearl rice was placed in the steam chamber, pressure raised by steaming to 45 lbs. during 5 minutes, held there for 1 minute and then fired.

(35) California Pearl rice was steamed quickly to 45 lbs., held there for 7 minutes and then fired.

(36) California Pearl rice was steamed quickly to 45 lbs., held there for 11 minutes and then fired.

(37) Rice was placed in the steam chamber, pressure raised by steaming to 50 lbs. during 5 minutes, held there for 1 minute and then fired. California Pearl and Texas Patna rice were used.

(38) California Pearl rice was placed in the steam chamber, pressure raised by steaming to 50 lbs. during 5 minutes, held there for 2 minutes and then fired.

(39) California Pearl rice was steamed quickly to 50 lbs., held there for 5 minutes and 15 seconds and then fired.

(40) California Pearl rice was steamed quickly to 50 lbs., held there for 6 minutes and then fired.

The resulting product, as already stated, has a specific gravity approximately 28.5% to 60% that of the original material. For example, Texas Patna rice before processing has a weight of 180 grams per cup, and after processing, about 60 grams per cup.

When the rice prepared in the manner described is boiled for five minutes, as compared to prior quick-cooking materials, the prior materials acquire a slight gluey appearance and texture, whereas the present product does not acquire such an objectionable appearance or texture. When tested in an Amylograph, as compared to a prior quick-cooking rice, the present product when used at 50 grams per 450 ml. showed considerably higher results for the present product up to 90° C., with a complete reversal, however, at 96° C. The curve for the present product was steady, but for the prior product had a change of from between 90° C. and 96° C., indicating a lack of complete gelatinization.

A number of runs were made to determine the average rate of hydration of the quick-cooking rice product of this invention. For each run the hydration determinations were made in duplicate using 180 gram samples. One sample of each run was placed in a double boiler containing one quart (946 grams), maintained at about 200° F. (+10° F.). After 5, 15, and 20 minute intervals the water-rice mixture was poured into a strainer while substantially all of the free water passed into the measuring cup in from 10 to 20 seconds. After weighing the free water, it and the rice were again placed in the double boiler. The difference in weight between the free water in the double boiler just prior to placing the rice sample therein and the weight of free water at each interval was the amount of water absorbed by the rice for that particular period of time. The absorbed moisture of the second sample of each run was determined in the same manner except that the hydration determinations were made at 10, 20 and 30 minute intervals.

It was found that water was absorbed by the present quick-cooking rice product at an average rate of 22% of the original dry weight per minute after 4 minutes, and for the next 10 minutes. The deviations from this hydration rate were from +6% to −2%. When compared with the hydration rate of prior quick-cooking rice, the product of this invention rehydrates in one-half the time.

When tested for protein efficiency, the present rice product has a 50% efficiency whereas the prior product had a negative protein efficiency. This indicates that the present product has a great deal of nutritional value.

An important property of the pre-cooked rice product produced in accordance with the process of this invention is the large amount of thiamine which is retained. Table II below shows the results of three determinations of the thiamine content of the pre-cooked rice of this invention as compared with the thiamine content of the raw rice and that of a prior quick-cooking rice.

*Table II*

| | Thiamine Content, Milligrams per 100 grams | | |
|---|---|---|---|
| Raw Texas Patna Rice | 0.0817 | 0.0693 | 0.095 |
| Pre-cooked Texas Patna Rice Product of this Invention | 0.0174 | 0.0276 | 0.030 |
| Prior Quick-cooking Rice | 0.0070 | 0.0095 | |

It is readily seen that the quick-cooking rice product retains at least one-third and up to two-thirds of the original thiamine content of the original rice. On the other hand, prior quick-cooking rice only retains from 5½ to 14% of the original thiamine content.

The rice product previously described is normally cooked by mixing from ¾ to 1 cup of cold water with one cup of rice, adding salt to taste and then bringing quickly to a boil while uncovered. If the cup weight of the material is 60 to 70 grams, ¾ cup of water is used per cup of rice; from 70 to 85 grams, ⅞ cup of water; and above 85 grams, 1 cup of water. The product is then fluffed lightly once or twice with a fork, but not stirred, and is then covered and removed from the heat and allowed to stand for ten minutes before serving.

In the case of producing a quick-cooking wheat product, hard winter wheat, finely ground in accordance with usual practice, was employed. Such a material, prior to pre-cooking, is now available on the market under the name, "Blue Cross Whole Wheat." Its cooking time is normally about ten minutes.

The material, prior to treatment, had a cup weight of approximately 117 grams.

The material was processed in ten pound lots, without any moistening or tempering operation. Tempering may be employed, but it has not been found to improve the material and, in some cases, has a deleterious effect.

The wheat is placed in the steaming chamber, and evacuation carried out to approximately 0.1 to 0.2 inch of mercury absolute for about two minutes, the wheat being at a temperature of not less than about 40° F. to remove the non-condensible gases from the wheat grains. Steam is then introduced to the steaming chamber accompanied by continued purging to cook the product and remove any condensate and non-condensible gases. The product is cooked sufficiently to gelatinize the starch, inactivate enzymes and supply sufficient plasticity for vacuum expanding. The amount of cooking required will vary considerably with the characteristics of the wheat grain, but may readily be determined by a preliminary test for any particular lot.

The preferred cooking cycle is to introduce steam to reach 50 pounds per square inch gauge in 20 to 25 seconds, after which the material is expanded by opening the triggered door to the expansion chamber which is at a pressure of about 0.2 inch of mercury absolute. Normally the pressure in the expansion chamber is not permitted to rise above about two inches of mercury absolute until cold setting of the vacuum expanded wheat grains occurs. In some instances, however, we have operated successfully with the pressure in the expansion chamber following explosion riding up as high as 3½ to 7 inches of mercury absolute as measured on a standard mercury manometer, but in most instances, the pressure was reduced below 2 inches of mercury absolute within a few minutes and before re-imposition of atmospheric pressure.

In one specific example, the steaming cycle was 50 pounds per square inch gauge of steam pressure reached in 23 seconds. In another, it was 75 pounds per square inch gauge of steam pressure reached in 26 seconds. In another, it was 35 pounds per square inch gauge of steam pressure reached in 22 seconds. In another, it was 25 pounds per square inch gauge steam pressure reached in 22 seconds.

After expanding, the product was dried by the introduction of superheated steam at about one inch of mercury absolute into the expansion chamber and continuing this operation for 10 minutes. That is, steam was continuously admitted while the evacuating apparatus was operated so that the pressure did not rise above 1 inch of mercury absolute. It is preferred to have a moisture content of approximately 10–15% in the product before further processing.

The expanded and dried whole wheat was then put through corrugated rolls. These corrugations cut the grains up to some extent, broke up clusters, and removed some loose starch from the grains.

The vacuum expanded wheat product has a volume from 1⅔ to 3½ times the original wheat grains. Put conversely, the specific gravity as determined by cup weight is from 28.5% to 60% of the specific gravity of the original wheat grains. It is granular in appearance, the grains being of a mixed brown and white color and substantially the shape of the original grains. It is capable of remarkably fast water absorption and can be cooked in approximately thirty seconds, as compared to ten minutes required for the original material.

In cooking, one cup of the processed wheat is slowly stirred into one and one-quarter cups of boiling water containing a quarter teaspoon of salt. The boiling is carried out for thirty seconds, after which the wheat is ready for serving.

The cooking operation increases the moisture content of the grain approximately 1% for each twenty to twenty-five degrees F. increase in temperature. This increase is lost on vacuum expanding, and the loss of water, plus the sudden cooling is believed to cause setting of the plasticity of the walls so that they will not collapse upon subsequent increase in pressure.

The starchy portions of the processed wheat are translucent. The surfaces have a somewhat vitreous appearance. The bundle of starch cells somewhat resembles a snowball.

In the case of producing a quick-cooking farina product, regular farina, which is the centers of hard wheat, was employed. Such a material, prior to pre-cooking, is now available on the market. Its normal cooking time is from two to five minutes.

The material, prior to treatment, had a cup weight of approximately 168 grams.

The material was processed in ten pound lots, without any moistening or tempering operation. Tempering may be employed, but it has not been found to improve the material and, in some cases, has a deleterious effect.

Farina is placed in the steaming chamber, and evacuation carried out to approximately 0.2 inch of mercury absolute for about two minutes, the farina being at a temperature of at least about 40° F. to remove the non-condensible gases from the farina particles. Steam is then introduced to the steaming chamber accompanied by continued purging to cook the product and remove any condensate and non-condensible gases. The product is cooked sufficiently to gelatinize the starch, inactivate enzymes and supply sufficient plasticity for vacuum expanding. The amount of cooking required will vary considerably with the characteristics of the farina particles, but may readily be determined by a preliminary test for any particular lot.

The preferred cooking cycle is to introduce steam to reach 35 pounds per square inch gauge in 20 to 30 seconds, after which the material is expanded by opening the triggered door to the expansion chamber which is at a pressure of about 0.2 inch of mercury absolute. Normally the pressure in the expansion chamber is not permitted to rise above about two inches of mercury absolute until cold setting of the vacuum expanded farina particles occurs. In some instances, however, we have operated successfully with the pressure in the expansion chamber riding up as high as 3½ to 7 inches of mercury absolute as measured on a standard mercury manometer, but in most instances, the pressure was reduced below 2 inches of mercury absolute within a few minutes and before re-imposition of atmospheric pressure.

In one specific example, the steaming cycle was 35 pounds per square inch gauge of steam reached in 30 seconds. In another, it was 40 pounds per square inch gauge of pressure reached in 38 seconds. In another it was 45 pounds per square inch gauge of steam pressure reached in 43 seconds. In another, it was 50 pounds per square inch gauge of steam pressure reached in 38 seconds. In another, it was 55 pounds per square inch gauge of steam pressure reached in 43 seconds. In another, it was 60 pounds per square inch gauge of steam pressure reached in 46 seconds. In another it was 25 pounds per square inch gauge of steam pressure reached in 30 seconds.

After expanding, the product was dried by the introduction of superheated steam at about one inch of mercury absolute into the expansion chamber and continuing this operation for from five to ten minutes. That is, steam was continuously admitted while the evacuating apparatus was operated so that the pressure did not rise above about one inch of mercury absolute. It is preferred to have a moisture content of approximately 10–15% in the product before further processing.

The expanded and dried farina was then put through corrugated rolls. These corrugations cut the expanded particles up to some extent, broke up clusters, and removed some loose starch.

The vacuum expanded farina product has a volume from 1½ to 2½ times the original farina particles. Put conversely, the specific gravity as determined by cup weight is from 40% to 66⅔% the specific gravity of the original farina particles. It is granular in appearance, the farina particles being of a snowy-white flecked with light-brown appearance, and substantially the shape of the original particles. It is capable of remarkably fast water absorption and can be cooked in approximately forty-five seconds, as compared to the two to five minutes required for the original material.

In cooking, ½ cup of the processed farina is slowly stirred into 1¼ cups of water containing a quarter teaspoon salt. The boiling is carried out for forty-five seconds, after which the farina is ready for serving.

The cooking operation increases the moisture content of the farina particles approximately 1% for each twenty to twenty-five degrees F. increase in temperature. This increase is lost on vacuum expanding, and the loss of water, plus the sudden cooling is believed to cause setting of the plasticity of the walls so that they will not collapse upon subsequent increase in pressure.

The starchy portions of the processed material are translucent. The surfaces have a somewhat vitreous appearance and the bundle of starch cells somewhat resembles a snowball.

In the case of producing a quick-cooking hominy product, regular hominy, ground to a 14–24 measurement, was employed. Such a material, prior to pre-cooking, is now available on the market. Its normal cooking time is about thirty minutes.

The material, prior to treatment, had a cup weight of approximately 169 grams.

The material was processed in forty pound lots, without any moistening or tempering operation. Tempering may be employed, but it has not been found to improve the material and, in some cases, has a deleterious effect.

Hominy is placed in the steaming chamber, and evacuation carried out to approximately 0.2 inch of mercury absolute for about 2 minutes, the hominy being at a temperature of at least about 40° F. to remove the non-condensible gases from the grits. Steam was then introduced to the steaming chamber accompanied by continued purging to cook the hominy and remove any condensate and non-condensible gases. The product is cooked sufficiently to gelatinize the starch, inactivate enzymes and supply sufficient plasticity for vacuum expanding. The amount of cooking required will vary considerably with the characteristics of the grits, but may readily be determined by a preliminary test for any particular lot.

The preferred cooking or steaming cycle is to introduce steam to reach 50 pounds per square inch gauge in about 55 seconds, after which the material is expanded by opening the triggered door to the expansion chamber, which was at a pressure of about 0.2 inch of mercury absolute. Normally the pressure in the expansion chamber is not permitted to rise above about two inches of mercury absolute until cold setting of the vacuum expanded hominy occurs. In some instances, however, we have operated successfully with the pressure in the expansion chamber following explosion riding up as high as 3½ to 7 inches of mercury absolute as measured on a standard mercury manometer; but in most instances the pressure was reduced below two inches of mercury absolute within a few minutes and before reimposition of atmospheric pressure.

In one specific example, the steaming cycle was sixty pounds per square inch gauge of steam reached in fifty-five seconds. In another, it was seventy-five pounds per square inch gauge of pressure reached in seventy-seven seconds. In another, it was fifty-five pounds per square inch gauge of steam pressure reached in forty-six seconds. In another, it was sixty-five pounds per square inch gauge of steam pressure reached in forty-seven seconds. In another, it was twenty-five pounds per square inch gauge steam pressure reached in forty seconds. In another, it was thirty-five pounds per square inch gauge pressure in about forty seconds.

After expanding, the product was dried by the introduction of superheated steam at about one inch of mercury absolute into the expansion chamber and continuing this operation for about five minutes. That is, steam was continuously admitted while the evacuating apparatus was operated so that the pressure did not rise above one inch of mercury absolute. It is preferred to have a moisture content of approximately 10–15% in the product before further processing.

The expanded and dried hominy was then granulated on corrugated rolls. These corrugations broke up clusters and removed some loose starch from the grits.

The vacuum expanded hominy product has a volume from 2½ to 5½ times the original hominy grits. Put conversely, the specific gravity as determined by cup weight is from 18.2% to 40% the specific gravity of the original hominy grits. It is granular in apperance having a snowy-white interior on cross-section and substantially the shape of the original grits. It is capable of remarkably fast water absorption and can be cooked in approximately thirty to sixty seconds as compared to thirty minutes required for the original material.

In cooking, one cup of the processed hominy is slowly stirred into two and one-quarter cups of water containing a half teaspoon salt. The boiling is carried out for thirty seconds, after which the material is ready for serving. More or less water may be added to suit individual tastes.

The cooking operation in the steaming chamber increases the moisture content of the hominy approximately 1% for each twenty to twenty-five degrees F. increase in temperature. This increase is lost on vacuum expanding, and the loss of water, plus the sudden cooling is believed to cause setting of the plasticity of the walls so that they will not collapse upon subsequent increase in pressure.

The starchy portions of the processed material are translucent. The surfaces have a somewhat vitreous appearance and the bundle of starch cells somewhat resembles a snowball.

The foregoing detailed description is given for clearness of understanding only, and no unnecessary limitations should be understood therefrom, as modifications will be obvious to those skilled in the art.

We claim:

1. The method of producing a quick-cooking cereal, which comprises: removing the air from the cereal and substituting an atmosphere of steam under pressure; adding steam thereto at increased pressure and temperature to raise the moisture content thereof and cook the cereal; then instantaneously reducing the pressure well below atmospheric pressure to cause an explosion resulting in expansion of the cereal; and maintaining a reduced pressure sufficient to cold set the expanded cereal during the explosion and until cold setting of the cereal occurs, the pressure at the inception of the explosion and the extent of pressure reduction being correlated to produce an expanded quick-cooking cereal having for a period of about twenty minutes a hydration rate at least 1/3 greater than that of the original cereal after immersion in water at about 200° F.

2. A cold set vacuum expanded quick-cooking cereal product produced by the process of claim 1.

3. The method of treating oats which comprises: substantially removing the air from the oats and substituting an atmosphere of steam under pressure; adding steam thereto at increased pressure and temperature to raise the moisture content thereof and cook the oats; then instantaneously reducing the pressure from at least about 25 pounds per square inch gauge to well below atmospheric pressure to cause an explosion resulting in expansion of the oats; and maintaining a reduced pressure sufficient to cold set the expanded oats during the explosion and until cold setting of the oats occurs, the pressure at the inception of the explosion and the extent of pressure reduction being correlated to produce an expanded product having a specific gravity between 28.5 and 60% of the original oat grains.

4. The method as set forth in claim 3 in which the steam operation is carried on to reach a pressure of from about 25 pounds to 75 pounds per square inch gauge.

5. The method as set forth in claim 3 in which the instantaneous pressure reduction is to 2 inches of mercury absolute or less.

6. A cold set vacuum expanded quick-cooking oat product produced by the process of claim 3.

CHARLES R. CARMAN.
JIM E. ALLISON.

References Cited in the file of this patent

UNITED STATES PATENTS

| Number | Name | Date |
|---|---|---|
| 1,933,158 | Bohn et al. | Oct. 31, 1933 |
| 2,287,737 | Huzenlaub | June 23, 1942 |
| 2,358,251 | Huzenlaub | Sept. 12, 1944 |
| 2,438,939 | Ozai-Durrani | Apr. 6, 1948 |